R. H. McLAIN.
MOTOR CONTROL SYSTEM.
APPLICATION FILED SEPT. 27, 1918.
1,334,774.
Patented Mar. 23, 1920.
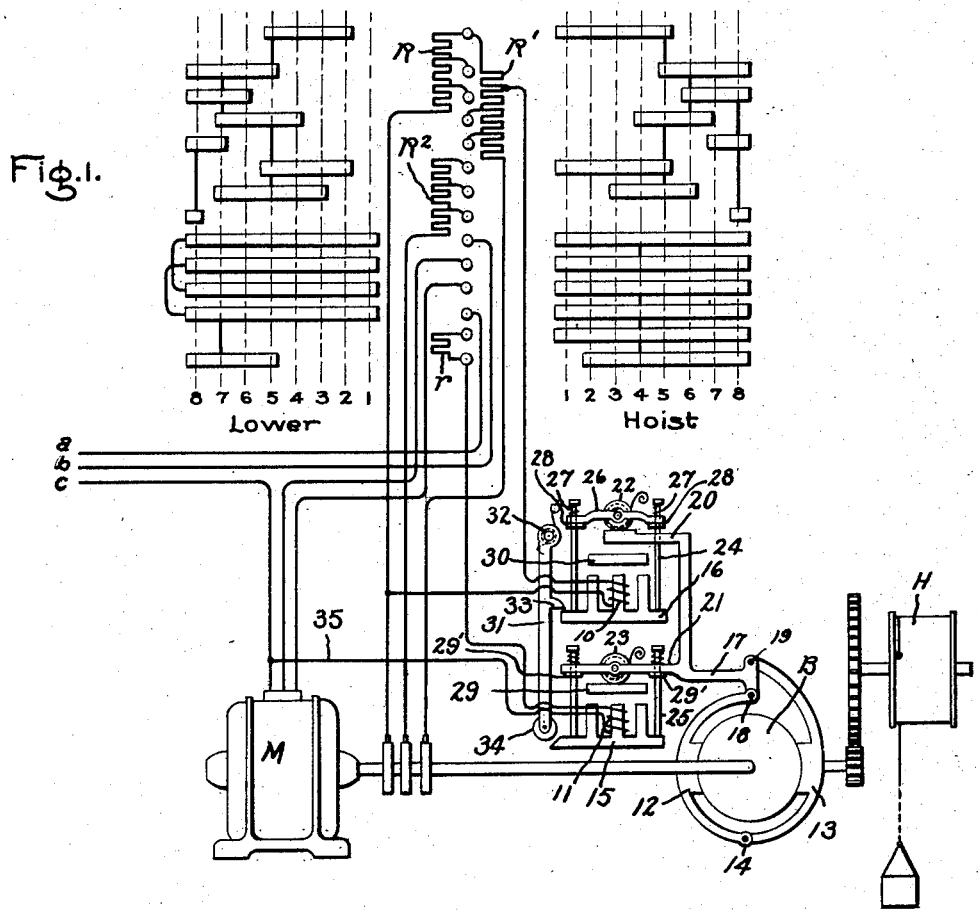
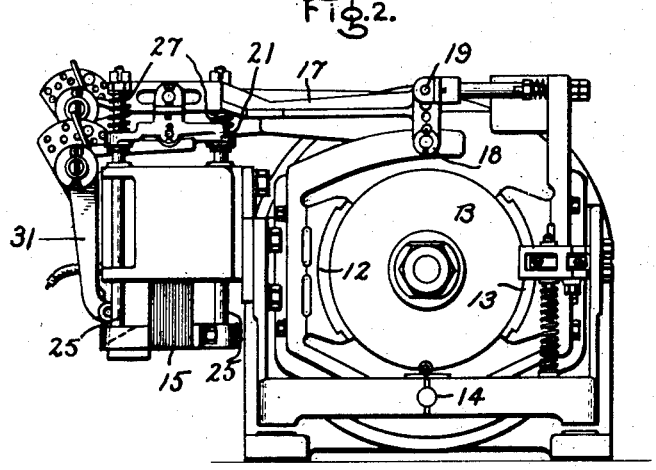
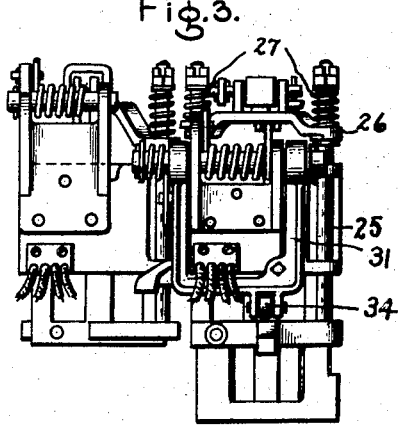
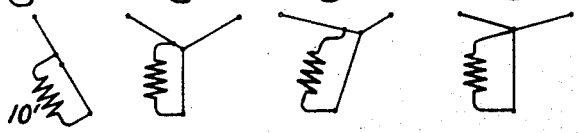
Inventor:
Robert H. McLain,
by Albert G. Davis
His Attorney.

UNITED STATES PATENT OFFICE.

ROBERT H. McLAIN, OF SCHENECTADY, NEW YORK, ASSIGNOR TO GENERAL ELECTRIC COMPANY, A CORPORATION OF NEW YORK.

MOTOR-CONTROL SYSTEM.

1,334,774.   Specification of Letters Patent.   Patented Mar. 23, 1920.

Application filed September 27, 1918. Serial No. 255,937.

*To all whom it may concern:*

Be it known that I, ROBERT H. McLAIN, a citizen of the United States, residing at Schenectady, in the county of Schenectady, State of New York, have invented certain new and useful Improvements in Motor-Control Systems, of which the following is a specification.

My invention relates to the control of electric motors and has for its object the provision of improved means whereby an electric motor may be stopped, started, and generally controlled in a reliable, simple and efficient manner.

My invention relates more specifically to the control of electric motors where it is desired that a definite speed or definite speeds shall be maintained regardless of the load on the motor. Such a condition is found in hoisting apparatus. It is highly desirable that in an electrically controlled hoist certain positions of the controller shall correspond to a definite speed of the motor so that when the controller is moved to one of those positions the operator will know that a definite speed of lowering or hoisting will be maintained irrespective of the load or the capacity of the apparatus. While my invention is capable of general application, it is particularly useful in connection with A. C. motors of the slip ring type which are very commonly employed for operating hoists.

In carrying out my invention I employ an electro-magnetic brake for mechanically controlling the speed of the motor and I so arrange the connections that the braking effect shall vary with the speed of the motor. When the motor starts to speed up the braking effect upon the motor will be increased, thereby tending to keep the speed constant for any given position of the controller. I also provide means whereby in case the motor fails to start, the brake is gradually released, but upon the speeding up of the motor the brake is applied with automatically increasing force.

In the accompanying drawing illustrating one form of my invention, Figure 1 is a diagrammatic view showing the brake and electrical connections thereof; Fig. 2 is a side view of the brake; Fig. 3 is an end view of the same, and Figs. 4–7 are diagrams illustrating coil connections.

Referring to Fig. 1, M represents the electric motor to be controlled which I have shown as of the three-phase slip ring type. R, R' and $R^2$ are resistances connected to the slip rings of the motor for bringing the motor up to speed in a well understood manner. B represents the mechanical brake on the motor shaft and H represents the drum of the hoist. The application of the brake is controlled by two electromagnetic windings 10 and 11. The winding 10 is connected to the slip rings of the motor so that as the motor speeds up its energization will be decreased due to the drop of voltage across the slip rings. This action is well understood in the art and requires no further description. Winding 11 is a shunt winding connected across the supply mains. The brake which comprises two brake shoes 12 and 13, pivoted at 14, is normally applied by the weight of the two magnet cores or frames 15 and 16 which hang upon the brake lever 17 pivoted to the brake shoes at 18 and 19. The lever 17 has two arms 20 and 21 upon which the two cores are respectively suspended. When the arms 20 and 21 are therefore pressed downward by the weight of the cores, the brake will be applied due to the shifting of the pivot points 18 and 19 in a well understood manner. The pressure of the two cores upon the lever is counteracted to some extent by the springs 22 and 23 which tend to support the frames so as to reduce the effective weight upon the brake lever. The tension of these springs is adjustable so as to adjust the action of the brake. In the particular arrangement shown each magnetic frame is supported by rods 24 and 25 respectively, which rods are suspended on the brake lever. The rods 24 pass through a bar 26 which is supported by the spring 22. The rods are yieldingly suspended by springs 27 which act as a cushion, and collars 28 are provided so that the upward thrust of the rods 24 and 25 tends to release the brake. The result of this construction as thus far described is that when neither of the windings 10 or 11 is energized the brake will be applied with its maximum force due to the combined weights of the magnetic frames 15 and 16, this maximum force being adjustable by adjusting the springs 22 and 23.

The magnetic frames 15 and 16 are lifted in order to relieve the brake by the magnetic pull between the frames 15 and 16 and co-operating stationary armature members 29 and 30. In other words, when the winding 11 is energized, the magnetic frame 15 will be attracted toward the stationary armature 29 and by means of the collars 29' secured to the rods 25 push upward on the brake lever 17, and when the winding 10 is energized the magnet frame 16 will be attracted toward the stationary armature member 30 and by reason of the collars 28 secured to rods 24 push upward on the bar 26 which hangs on the brake lever. As shown, the magnet frames 15 and 16 are E shaped and the windings are on the middle arm of the frame which acts as a core. If, therefore, either one or both of the windings 10 and 11 should be energized, there will be a tendency to relieve the brake due to the lifting of the weights 15 and 16 suspended from the brake lever. The force with which the brake is applied will, therefore, depend upon the amount of energization of these windings. It will be noted that the two magnet frames 15 and 16 are interlocked by an interlocking bar 31, yieldingly mounted at 32, which prevents the magnet frame 16 from being drawn up more than a certain extent, so as not to approach too close to stationary armature 30 until the magnet frame 15 has first been completely raised. This is accomplished by a shoulder 33 on the interlocking bar which normally prevents the frame 16 from rising. When, however, the frame 15 is raised, it engages a roller 34 on the lower end of the interlocking bar and forces the bar 31 outward so that the shoulder 33 is clear of the path of the frame 16. The purpose of this interlocking will hereinafter appear.

The control of the windings 10 and 11, and hence the control of the brake, will now be explained. It will be seen by reference to Fig. 1 that I have shown a reversing controller which, when thrown so as to engage the right hand segments, will cause the motor to operate in a hoisting direction, and when thrown to engage the left-hand segments will operate the hoist in a lowering direction. It will be noted that the winding 11 is connected across between the two mains of the three-phase circuit which I have indicated as $a$, $b$ and $c$. In the first position of the controller on the hoisting side this winding is in series with a resistance $r$, the circuit being from line $c$, conductor 35 through the winding 11, resistance $r$, through the controller, and back to line $a$. In the first hoisting position, therefore, the winding 11 will be energized, but not to its full extent, so that the magnet frame 15 will be lifted so as to relieve the brake somewhat. In the second and all subsequent positions, however, the resistance $r$ is short circuited so that the winding 11 will be energized at its maximum, thereby lifting its core and relieving the brake entirely.

The winding 10 is also energized in the first position of the controller. The energization of this winding 10 is substantially a maximum in the first position, it being connected across the resistance R and a portion of resistance R'. The considerations which control the particular point on the resistance at which the coil is connected will hereinafter appear. In the first hoisting position of the controller, therefore, the brake is only partially relieved by the energization of the winding 11, the winding 10 being connected across the resistance R and a portion of R' so that the energization of winding 10 will vary with the speed. In this position, therefore, a substantially constant creeping speed will be obtained, since any tendency of the motor to speed up will be substantially off-set by the increased braking due to the decreasing pull of the magnet 10. In the succeeding positions of the controller, however, on the hoisting side, the winding 10 will have no effect since the brake has been entirely relieved by the full energization of the winding 11. In other words, the winding 11 is designed so that when fully energized it will entirely relieve the brake.

On the lowering side, however, the situation is different. It will be noted that in the first four positions of the controller on the lowering side the winding 11 is not energized, so that the brake is responsive entirely to the energization of the winding 10. In the first position the resistance $R^2$ is not connected and the secondary is connected to the resistances R, R' in series. This is a connection which is commonly used to give a low torque. The winding 10 being connected across resistance R and a portion of R' any increase in speed will be prevented by the increased braking effect due to the decreased energization of the winding 10. A substantially constant speed will therefore be obtained on the first point. In the second position the resistance $R^2$ is connected in the circuit and the three-phase connection is made. This will produce increased torque on the motor and produce a speed which is higher for a given load, than was produced by the first position and will be held substantially constant. That is, there will be no substantial acceleration or deceleration from the speed because of the equalizing effect of the mechanical braking due to the inverse variation in the energization of the winding 10 with the speed. This is likewise true in positions 3 and 4, although in these positions the resistances $R^2$ and $R'$ are varied to increase the motor torque. In the last four positions on the lowering side, however, the winding 11 is energized so as to entirely relieve the brake and the winding 10 will, therefore, have no effect in these positions.

I shall now explain the reason for making the particular connections of the winding 10 which I have shown, which reasons apply only to the lowering of the load. In lowering the load it may be that the load is such that in the first position of the controller the motor will not start. It might even be such that it would not start in the 2nd, 3rd, or even 4th positions under ordinary circumstances. In order to insure the starting, therefore, on the first positions of the controller I have connected the winding 10 so that it will be increasingly energized as the controller is moved to the 2nd, 3rd, and 4th positions respectively in case the motor fails to start. This I accomplish by connecting the winding across a portion of the resistance instead of across the slip rings where it might be connected and get the same effect so far as its effect during the speeding up of the motor is concerned. This connection will best be understood by referring to Figs. 4 to 7. Fig. 4 represents the connection on position 1, the coil 10 being connected across resistance R and a portion of resistance $R'$. Fig. 5 shows the connections on position 2 in which the resistance $R'$ is now connected in the circuit so as to give a substantially balanced condition. The winding 10 will now receive a somewhat increased voltage. Fig. 6 represents the condition which will obtain on position 3 of the controller, from which it will be seen that due to the fact that part of the resistance $R^2$ has been short circuited, the resistance legs are unbalanced and the winding 10 receives a larger percentage of voltage. Likewise in Fig. 7 the resistance legs are again changed so as to further increase the voltage on the winding 10. This, of course, is all predicated upon the motor not starting, since, of course, as soon as the motor starts, the voltage upon the winding 10 will immediately decrease as above described. Of course, this same kind of action would be obtained if the winding 10 were simply connected across the resistance R, for instance, but the effect will be greater or less at different points on the resistance. I have found, for instance, that by making a circuit connection which may be represented by that shown in Fig. 1, the voltage upon the winding 10 may be increased from 60% on the first point to 64%, 75% and 76% on the second, third and fourth positions respectively. These figures are given merely to illustrate the rate at which the voltage may increase and may of course vary considerably. This will have quite a substantial effect in relieving the brake and giving the motor a tendency to start. This is of advantage when the line voltage $a$, $b$, $c$, is lower than normal.

In Figs. 2 and 3, I have shown the brake as it is built in practice. The operation is identical with that above described and the construction will be clear since I have employed the same reference letters to similar parts in both cases. It will be understood that the magnet frames or cores 15 and 16 will be drawn within their respective windings when the windings are sufficiently energized.

It will be seen that I have provided an arrangement in which the brake may be entirely relieved by throwing the controller to the proper position or the braking effect may be caused to vary with the speed of the motor so as to bring about a substantially constant speed for a given load. The brake is also automatically relieved in case the motor fails to start.

While I have described my invention in concrete form and as operating in a specific manner in accordance with the patent statutes, it should be understood that I do not limit my invention thereto as various modifications thereof will suggest themselves to those skilled in the art without departing from the spirit of my invention, the scope of which is set forth in the annexed claims.

What I claim as new and desire to secure by Letters Patent of the United States, is:

1. The combination with an electric motor, of means for controlling the same comprising a resistance for varying the speed of the motor, a controller therefor, an electromagnetically controlled brake biased to braking position and having a winding energized responsively to the voltage drop across the resistance for releasing the brake, and connections whereby as the controller is moved to vary the resistance the brake is applied to the motor with automatically varying force to maintain the speed substantially constant at varying loads.

2. The combination with an electric motor, of means for controlling the same comprising a resistance for varying the speed of the motor, a controller therefor, an electromagnetically controlled brake for the motor, and connections whereby as the controller is moved to increase the speed of the motor the brake is gradually released in case the motor does not speed up but upon the speeding up of the motor the brake is applied with automatically increasing force.

3. The combination with an alternating current motor, of means for controlling the same comprising a resistance for the rotor circuit, a controller therefor, an electromagnetic brake for the motor, and connections whereby movement of the controller varies the resistance and connects the winding of the brake across the resistance to cause it to be subjected to varying voltage as the speed varies.

4. The combination with an alternating current motor, of means for controlling the same comprising a resistance for the rotor circuit, a controller therefor, an electromagnetically controlled brake for the motor, and connections whereby movement of the controller varies the resistance and increasingly energizes the brake winding in case the motor does not speed up but upon speeding up of the motor causes the brake pressure to vary the speed.

5. The combination with an electric motor and means for controlling the same comprising a resistance for varying the speed of the motor, an electromagnetically controlled brake biased to braking position, and connections whereby as the controller is moved to increase the speed of the motor the winding of the brake is decreasingly energized.

6. The combination with an electric motor and means for controlling the same comprising a resistance for varying the speed of the motor, an electromagnetically controlled brake biased to braking position, connections whereby as the controller is moved to increase the speed of the motor the winding of the brake is decreasingly energized and the brake applied with increasing force, and electromagnetic means for releasing the brake at any time regardless of the speed.

7. The combination with an electric motor and a reversing controller therefor, of an electromagnetically controlled brake biased to braking position and connections whereby when the controller is moved to one position the brake is partially relieved and when moved to the opposite position the braking effect varies with the speed of the motor.

8. The combination with an electric motor, a controller therefor, an electromagnetic brake biased to braking position having a winding for releasing the brake and a winding which causes an increasing braking effect as the motor speeds up and means for energizing said winding in various positions of the controller.

9. The combination with an electric motor, a starting resistance therefor, an electric brake having a winding connected to the resistance so that it will be decreasingly energized as the motor speeds up and having a core which normally acts to apply the brake whereby the brake will be increasingly applied as the motor increases in speed.

10. The combination with an alternating current motor of the slip ring type, a starting resistance in the rotor circuit, an electromagnetic brake having a winding connected to said resistance and a core which normally acts to apply the brake so that the brake will be increasingly applied as the motor speeds up.

11. The combination with an electric motor and a reversing controller therefor, of an electro magnetic brake biased to braking position, and connections whereby when the controller is moved to the first position for one direction of rotation the brake is partially relieved and in other positions is totally relieved, and when it is moved to the reverse position the braking effect varies with the speed of the motor.

12. The combination with an electric motor, of an electromagnetically controlled brake therefor having two windings, cores for said windings which normally act to apply the brake, one of said windings being connected to relieve the brake and the other to be decreasingly energized as the motor speeds up.

13. The combination with an electric motor, and a reversing controller therefor, of an electromagnetically controlled brake for the motor having two cores which normally act to apply the brake, one of said windings being connected to relieve the brake and the other to be decreasingly energized as the motor speeds up, and connections whereby in one position of the controller the winding which relieves the brake is energized and in the reverse position the other winding only is energized.

14. The combination with an electric motor of the slip ring type and a starting resistance for the rotor circuit, of an electromagnetically controlled brake having two cores which normally act to apply the brake and two windings, one of which is connected to the resistance so that its energization varies inversely with the speed while the other is energized at a constant rate sufficiently to relieve the brake and means for energizing said windings in various positions of the controller.

15. The combination with an alternating current motor of the slip ring type, of means for controlling the same comprising a resistance in the rotor circuit, a controller therefor, an electromagnet brake biased to the braking position, the said brake having a winding energized responsively to the voltage drop across the resistance and a core operatively connected to release the brake when the winding is energized, and connections whereby as the controller is moved to vary the resistance the brake is applied to the motor with automatically varying force.

16. The combination with an alternating current motor of the slip ring type, means for automatically maintaining the speed of the motor substantially constant comprising an electromagnet brake biased to the braking position, the said brake having a winding energized responsively to the voltage drop across the slip rings and a core operatively connected to release the brake to a degree depending on the value of the energization of said winding.

In witness whereof I have hereunto set my hand this 25th day of September, 1918.

ROBERT H. McLAIN.